United States Patent [19]
Ootsuka et al.

[11] Patent Number: 5,392,138
[45] Date of Patent: Feb. 21, 1995

[54] FACSIMILE APPARATUS

[75] Inventors: Nobuhiro Ootsuka; Yuji Hirai, both of Fukuoka; Shigehiko Kaneko, Fukuoka, all of Japan

[73] Assignee: Matsushita Electric Industrial Co., Ltd., Japan

[21] Appl. No.: 940,387

[22] Filed: Sep. 3, 1992

[30] Foreign Application Priority Data

| Sep. 6, 1991 | [JP] | Japan | 3-226258 |
| Nov. 20, 1991 | [JP] | Japan | 3-304419 |
| Jun. 12, 1992 | [JP] | Japan | 4-153231 |

[51] Int. Cl.6 .................................. H04N 1/00
[52] U.S. Cl. .................................. 358/498; 358/468
[58] Field of Search ............... 358/498, 183, 447, 462, 358/449, 475, 461, 488, 496; D18/59; 382/22, 54; 355/316, 317, 308; 271/265, 227, 258, 259, 261, 262, 266

[56] References Cited

U.S. PATENT DOCUMENTS

| 4,001,785 | 1/1977 | Miyazaki et al. | 340/172.5 |
| 4,290,085 | 9/1981 | Kolker | 358/264 |
| 4,602,867 | 7/1986 | Shimizu et al. | 355/55 |
| 4,608,662 | 8/1986 | Watanabe et al. | 364/900 |
| 4,731,658 | 3/1988 | Koseki | 358/287 |
| 4,905,098 | 2/1990 | Sakata | 358/468 |
| 4,989,018 | 1/1991 | Tsuchiya et al. | 358/296 |
| 5,051,771 | 9/1991 | Kimura et al. | 355/27 |
| 5,060,080 | 10/1991 | Hwang | 358/401 |
| 5,061,958 | 10/1991 | Bunker et al. | 355/209 |
| 5,189,523 | 2/1993 | Sugiura et al. | 358/300 |
| 5,216,526 | 6/1993 | Ju | 358/498 |

Primary Examiner—Paul Ip
Attorney, Agent, or Firm—Parkhurst, Wendel & Rossi

[57] ABSTRACT

A facsimile apparatus includes a recording-paper feeding mechanism for feeding a recording paper. A setting device serves to set whether or not saving the recording paper is required. A receiving device serves to receive image information. A printing head serves to sequentially print line parts of an image, which is represented by the received image information, on the recording paper. In cases where the setting device sets a requirement of saving the recording paper, the recording-paper feeding mechanism is controlled so as to reduce a distance by which the recording paper is fed with respect to one line part of the image.

4 Claims, 10 Drawing Sheets

FIG. 8

Fax Correspondence

Date:
Page:

TO:
FROM:
RE:

FIG. 9

Fax Correspondence

Date:
Page:

TO:
FROM:
RE:

FACSIMILE APPARATUS

BACKGROUND OF THE INVENTION

1. Field of the Invention

This invention relates to a facsimile apparatus.

2. Description of the Prior Art

In a transmission side of facsimile communication, a document image to be transmitted is converted into a corresponding electric signal by an image scanner. The electric image signal undergoes a modulation process before being outputted to a transmission line or a telephone line.

The transmitting operation of a general facsimile apparatus can be changed between a standard mode and a fine mode (also referred to as a standard-resolution mode and a fine-resolution mode respectively). In the standard mode of transmitting operation, transmitted image Information has a resolution of 3.85 line/mm. In the fine mode of transmitting operation, transmitted image information has a resolution of 7.7 line/min.

In a reception side of facsimile communication, a signal received via a telephone line is subjected to a demodulation process to recover an original image signal, and an image represented by the image signal is printed on a recording paper at a resolution approximately equal to the transmission-side resolution.

Generally, the area of a recording paper used by the reception side of facsimile communication is approximately equal to the size of a transmitted document paper in dependent of the contents of transmitted image information.

SUMMARY OF THE INVENTION

From the standpoint of economy of a recording paper, it is advantageous to make variable a used area of a recording paper.

It is an object of this invention to provide an improved facsimile apparatus.

A first aspect of this invention provides a facsimile apparatus comprising recording-paper feeding means for feeding a recording paper; setting means for setting whether or not saving the recording paper is required; receiving means for receiving image information; a printing head for sequentially printing line parts of an image, which is represented by the received image information, on the recording paper; and controlling means for, in cases where the setting means sets a requirement of saving the recording paper, controlling the recording-paper feeding means to reduce a distance by which the recording paper is fed with respect to one line part of the image.

A second aspect of this invention provides a facsimile apparatus comprising document-paper feeding means for feeding a document paper, an image of which is to be transmitted; setting means for setting whether or not saving a recording paper in a reception-side other party is required; an image scanner for sequentially scanning line parts of the document paper to sequentially convert line segments of an image of the document paper into corresponding image information; transmitting means for transmitting the image information toward the reception-side other party; and controlling means for, in cases where the setting means sets a requirement of saving the recording paper in the reception-side other party, controlling the document-paper feeding means to increase a distance by which the document paper is fed while the image scanner scans one line part of the document paper.

A third aspect of this invention provides a facsimile apparatus comprising recording-paper feeding means for feeding a recording paper by a given step in response to each drive pulse; setting means for setting whether or not saving the recording paper is required; receiving means for receiving image information; a printing head for sequentially printing line parts of an image, which is represented by the received image information, on the recording paper; and controlling means for, in cases where the setting means does not set a requirement of saving the recording paper, supplying two successive drive pulses to the recording-paper feeding means to feed the recording paper by twice the given step with respect to one line part of the image, and for, in cases where the setting means sets a requirement of saving the recording paper, supplying one drive pulse to the recording-paper feeding means to feed the recording paper by the given step with respect to one line part of the image.

A fourth aspect of this invention provides a facsimile apparatus comprising document-paper feeding means for feeding a document paper, an image of which is to be transmitted, by a given step in response to each drive pulse; setting means for setting whether or not saving a recording paper in a reception-side other party is required; an image scanner for sequentially scanning line parts of the document paper to sequentially convert line segments of an image of the document paper into corresponding image information; transmitting means for transmitting the image information toward the reception-side other party; and controlling means for, in cases where the setting means does not set a requirement of saving the recording paper in the reception-side other party, supplying two successive drive pulses to the document-paper feeding means to feed the document paper by twice the given step while the image scanner scans one line part of the document paper, and for, in cases where the setting means sets a requirement of saving the recording paper in the reception-side other party, supplying four successive drive pulses to the document-paper feeding means to feed the document paper by four times the given step while the image scanner scans one line part of the document paper.

A fifth aspect of this invention provides a facsimile apparatus comprising recording-paper feeding means for feeding a recording paper; setting means for setting and selecting one of expanded printing or normal printing; a printing head for sequentially printing line parts of an image, which is represented by image information, on the recording paper; and controlling means for, in cases where the setting means sets and selects the expanded printing, controlling the recording-paper feeding means to feed the recording paper by a first given distance with respect to one line part of the image, and for, in cases where the setting means sets and selects the normal printing, controlling the recording-paper feeding means to feed the recording paper by a second given distance with respect to one line part of the image, the second given distance being smaller than the first given distance.

A sixth aspect of this invention provides a facsimile apparatus comprising a recording paper; first means for generating a signal representing whether or not saving the recording paper is required; second means for, when the signal generated by the first means represents that saving the recording paper is required, printing one line segment of an image on one line area of the recording paper; and third means for, when the signal, generated by the first means represents that saving the recording paper is not required, printing one line segment of an image on each of at least two successive line areas of the recording paper.

BRIEF DESCRIPTION OF THE DRAWINGS

FIG. 8 is a plan view showing an example of a standard-resolution image printed on a recording paper which occurs in the absence of a paper-sieving requirement in the facsimile apparatus of FIG. 1.

FIG. 9 is a plan view showing an example of a standard-resolution image printed on a recording paper which occurs in the presence of a paper-saving requirement in the facsimile apparatus of FIG. 1.

DESCRIPTION OF THE FIRST PREFERRED EMBODIMENT

Figure 1:
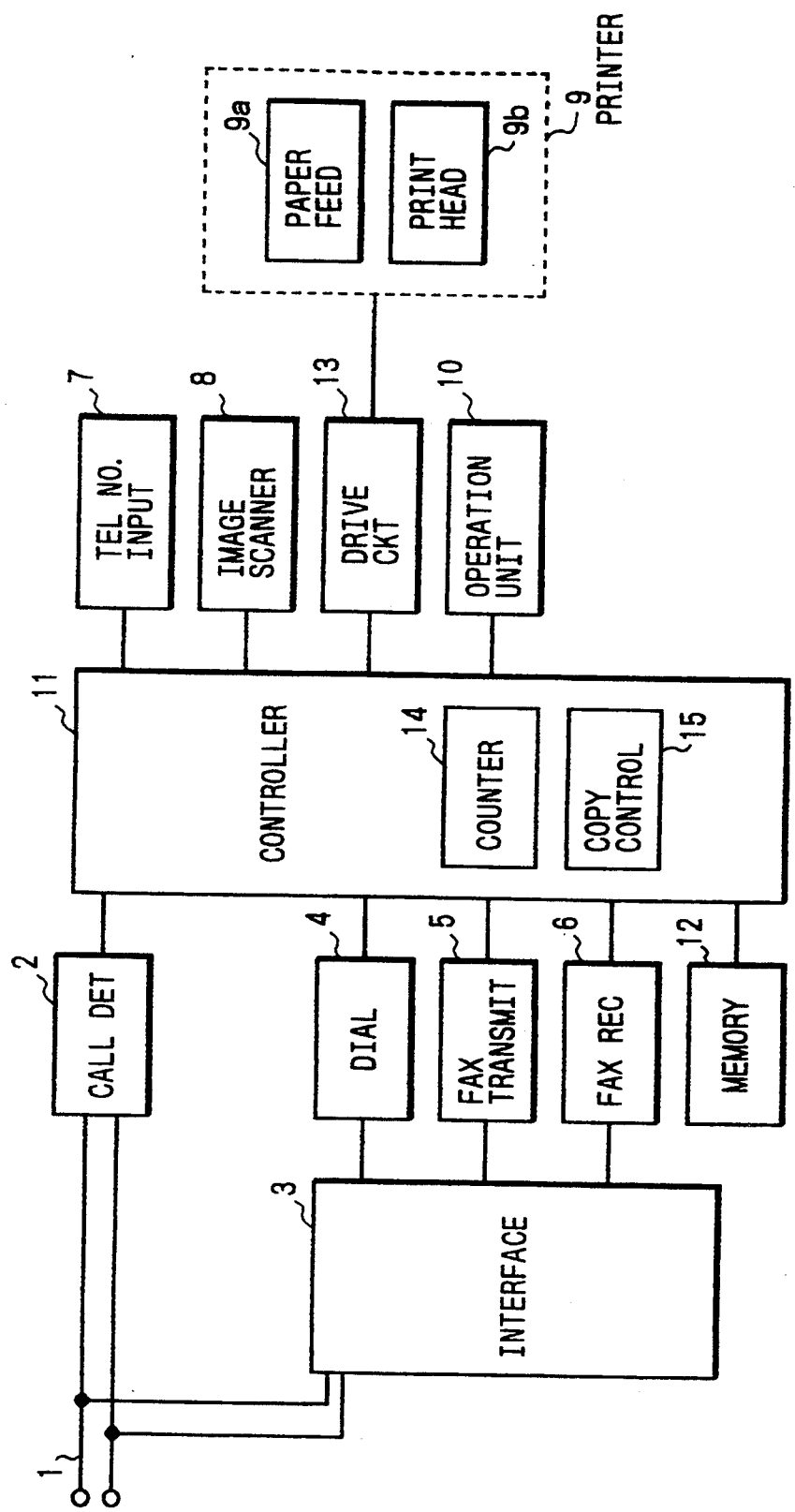
FIG. 1 is a block diagram of a facsimile apparatus according to a first embodiment of this invention.

With reference to FIG. 1, a facsimile apparatus includes a call incoming signal detector 2 and an interface circuit 3 which are connected to a telephone line 1. A dial unit (an automatic dialing device) 4, a facsimile signal transmitter 5, and a facsimile signal receiver 6 are connected between the interface circuit 3 and a controller 11. The call incoming signal detector 2 is connected to the controller 11. A telephone number input unit 7, an image scanner 8, an operation unit 10, a memory 12, and a drive circuit 13 are connected to the controller 11. The memory 12 includes a buffer able to store an amount of image information which corresponds to at least one line. A printer 9 connected to the drive circuit 13 includes a mechanism 9a for feeding a recording paper, and printing head 9b. The paper feeding mechanism 9a and the printing head 9b are controlled and driven by output signals of the drive circuit 13.

The controller 11 includes a microcomputer having a combination of an I/O port, a CPU, a RAM, and a ROM. The controller 11 operates in accordance with a program stored in the ROM. The controller 11 forms a counter 14 and a copy control section 15.

Figure 2:
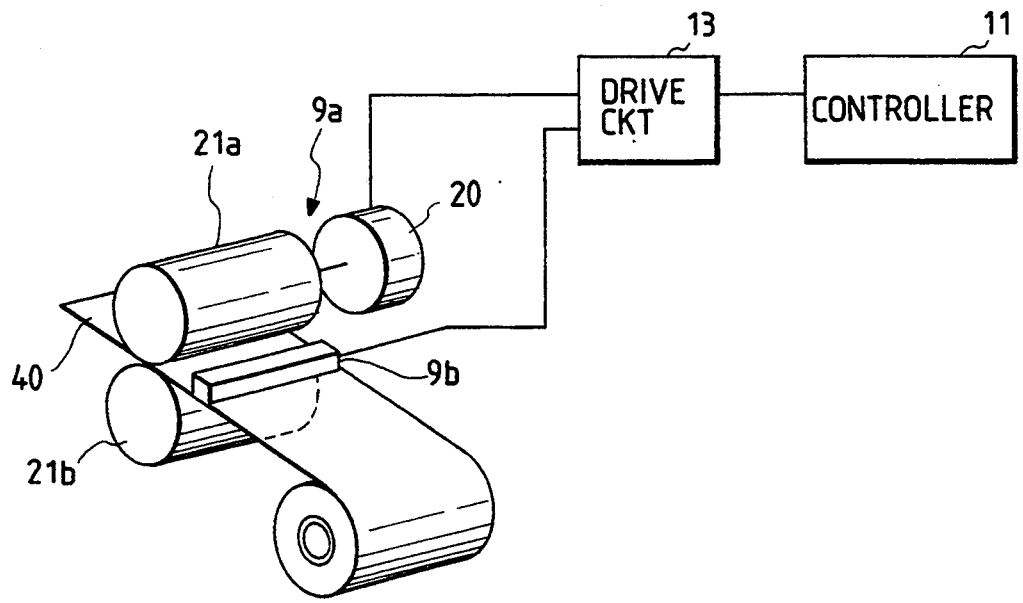
FIG. 2 is a diagram of the printer and associated devices in the facsimile apparatus of FIG. 1.

As shown in FIG. 2, the paper feeding mechanism 9a includes a stepping motor 20 and a pair of feed rollers 21a and 21b. The stepping motor 20 is coupled with the feed roller 21a. The stepping motor 20 rotates the feed roller 21a step by step in response to pulses of a drive signal outputted from the drive circuit 13. A part of a recording paper (a chart) 40 is sandwiched between the feed rollers 21a and 21b. As the feed roller 21a rotates, the recording paper 40 is fed in a sub scanning direction. Color of the recording paper 40 is changed by a heating process. The printing head 9b extends across the recording paper 40, and executes a heating process on the recording paper 40 in response to an image signal outputted from the drive circuit 13. The printing head 9b prints an image, which is represented by the output signal of the drive circuit 13, on the recording paper 40.

Figure 3:
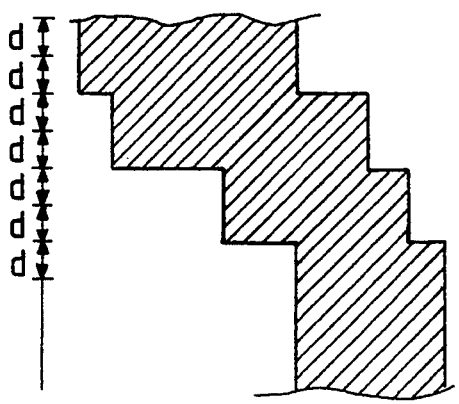
FIG. 3 is a diagram showing an example of an image printed on a recording paper which occurs during a standard-resolution mode of printing operation in the facsimile apparatus of FIG. 1.
Figure 4:
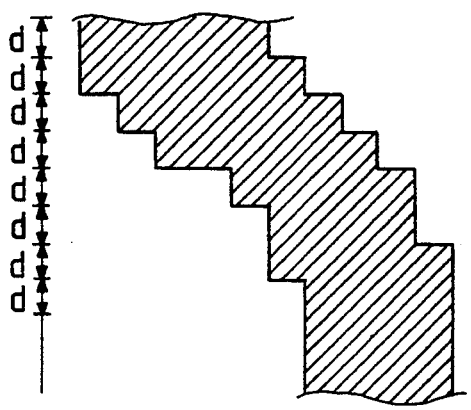
FIG. 4 is a diagram showing an example of an image printed on a recording paper which occurs during a fine-resolution mode of printing operation in the facsimile apparatus of FIG. 1.

Each time a drive pulse is applied to the stepping motor 20, the recording paper 40 is fed along the sub scanning direction by a given step or a given distance "d" equal to 0.13 mm. The printing operation of the facsimile apparatus can be changed between a standard-resolution mode and a fine-resolution mode. FIG. 3 shows an example of an image printed on the recording paper 40 which occurs during the standard-resolution mode of printing operation. As shown in FIG. 3, during the standard-resolution mode of printing operation, a printed image is composed of (scanning) lines each extending along a main scanning direction and each corresponding to a couple of steps "d" defined along the sub scanning direction. FIG. 4 shows an example of an image printed on the recording paper 40 which occurs during the fine-resolution mode of printing operation. As shown in FIG. 4, during the fine-resolution mode of printing operation, a printed image is composed of (scanning) lines each extending along the main scanning direction and each corresponding to one step "d" defined along the sub scanning direction.

Figure 5:
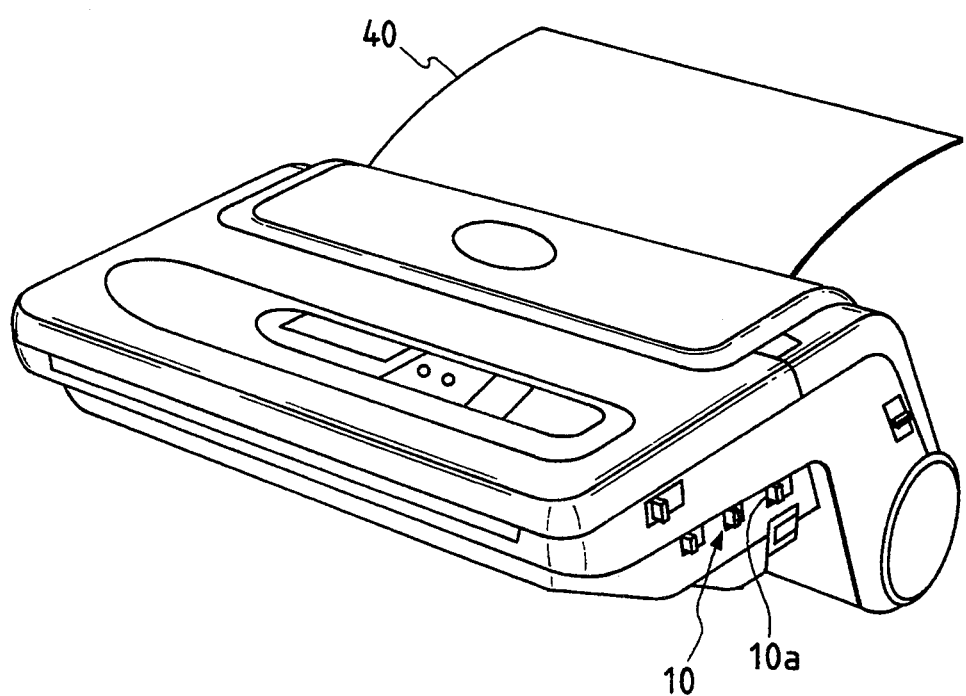
FIG. 5 is a perspective view of the facsimile apparatus according to the first embodiment of this invention.

As shown in FIG. 5, the operation unit 10 includes a manually-operated switch 10a provided on a casing of the facsimile apparatus. By changing the switch 10a between two states, it is possible to selectively execute and unexecute a paper-saving process. The switch 10a functions to generate a signal representing whether or not a paper-saving process is required.

Figure 6:
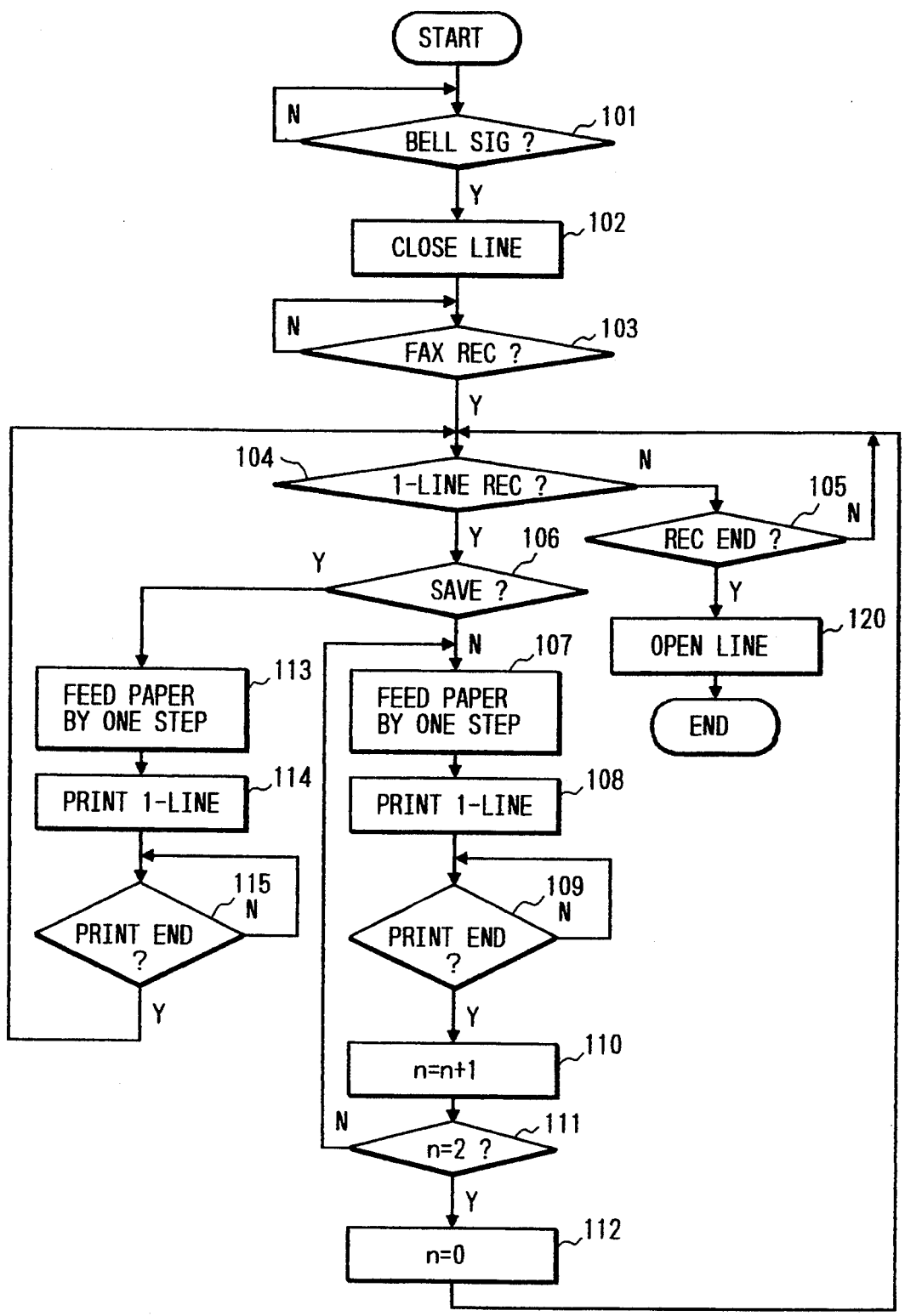
FIG. 6 is a flowchart of a receiving segment of a program operating the controller in FIG. 1.

As described previously, the controller 11 operates in accordance with the program. FIG. 6 is a flowchart of a receiving segment of the program.

As shown in FIG. 6, a first step 101 of the receiving segment of the program decides whether or not a bell signal (a call signal) is received by referring to an output signal of the call incoming signal detector 2. When the bell signal is decided to be received, the program advances from the step 101 to a step 102. Otherwise, the step 101 is repeated again.

The step 102 controls the interface circuit 3 so that the interface circuit 3 will close the telephone line 1. After the step 102, the program advances to a step 103. The step 103 decides whether or not a facsimile signal is received by referring to an output signal of the facsimile signal receiver 6. When the facsimile signal is decided to be received, the program advances from the step 103 to a step 104. Otherwise, the step 103 is repeated again. The facsimile signal receiver 6 subjects the facsimile signal to a demodulation process, recovering original facsimile image information therefrom. The recovered facsimile image information is stored into the memory 12.

The step 104 decides whether or not a 1-line portion (a 1-line-corresponding portion) of the facsimile image information has been received by referring to, for example, the output signal of the facsimile signal receiver 6. When a 1-line portion of the facsimile image information has been received, the program advances from the step 104 to a step 106. Otherwise, the program advances from the step 104 to a step 105.

The step 105 decides whether or not the reception of all facsimile image information has been completed. When the reception of all facsimile image information has been completed, the program advances from the step 105 to a step 120. Otherwise, the program returns from the step 105 to the step 104. The step 120 controls the interface circuit 3 so that the interface circuit 3 will open the telephone line 1. After the step 120, the execution of the receiving segment of the program ends.

The step 106 decides whether or not a paper-saving requirement is present by referring to an output signal of the operation unit 10 which relates to the switch 10a. In addition, the step 106 decides whether the received facsimile image information is of a standard-resolution format or a fine-resolution format. When a paper-saving requirement is decided to be present or when the received facsimile image information is decided to be of a fine-resolution format, the program advances from the step 106 to a step 113. In other cases, the program advances from the step 106 to a step 107. For example, when a paper-saving requirement is decided to be absent and the received facsimile image information is decided to be of a standard-resolution format, the program advances from the step 106 to the step 107.

The step 107 controls the drive circuit 13 so that the recording paper 40 will be fed by one step, that is, a distance of 0.13 mm. A step 108 following the step 107 transfers the 1-line portion of the facsimile image information from the memory 12 to the drive circuit 13, and also controls the drive circuit 13 so that the 1-line portion of the facsimile image information will be printed on a line area (part) of the recording paper 40. After the step 107, the program advances to a step 109. The step 109 decides whether or not printing the 1-line portion of the facsimile image information has been completed. When printing the 1-line portion of the facsimile image information has been completed, the program advances from the step 109 to a step 110. Otherwise, the step 109 is repeated again. The step 110 increments a counter value "n" by "1". It should be noted that the counter value "n" is initially equal to "0" and is provided in the counter 14. A step 111 following the step 110 decides whether or not the counter value "n" is equal to "2". When the counter value "n" is decided to be equal to "2", the program advances from the step 111 to a step 112. When the counter value "n" is decided to be different from "2", the program returns to the step 107 so that the sequence of the steps 107–111 will be repeated again. As a result, in the case where the paper-saving requirement is absent and the received facsimile image information is of the standard-resolution format, the same 1-line portion of the facsimile image information is repeatedly printed on successive two line areas (parts) of the recording paper 40.

The step 112 resets the counter value "n" to "0". After the step 112, the program returns to the step 104.

The step 113 controls the drive circuit 13 so that the recording paper 40 will be fed by one step, that is, a distance of 0.13 mm. A step 114 following the step 113 transfers the 1-line portion of the facsimile image information from the memory 12 to the drive circuit 13, and also controls the drive circuit 13 so that the 1-line portion of the facsimile image information will be printed on a line area (part) of the recording paper 40. After the step 114, the program advances to a step 115. The step 115 decides whether or not printing the 1-line portion of the facsimile image information has been completed. When printing the 1-line portion of the facsimile image information has been completed, the program returns from the step 115 to the step 104. Otherwise, the step 115 is repeated again. As a result, in the case where the paper-saving requirement is present or the received facsimile image information is of the fine-resolution format, the 1-line portion of the facsimile image information is printed on only a 1-line area (part) of the recording paper 40.

Figure 7:
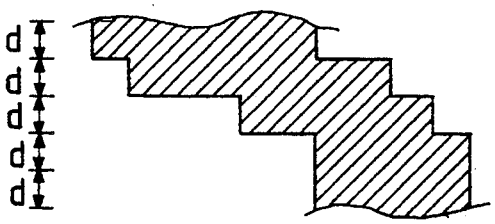
FIG. 7 is a diagram showing an example of an image printed on a recording paper which occurs in the presence of a paper-saving requirement in the facsimile apparatus of FIG. 1.

FIG. 3 shows an example of a standard-resolution image printed on the recording paper 40 which occurs in the absence of a paper-saving requirement. In FIG. 3, a 1-line image segment is repeatedly printed on two successive line parts of the recording paper 40. FIG. 7 shows the same standard-resolution image printed on the recording paper 40 which occurs In the presence of a paper-saving requirement. In FIG. 7, a 1-line image segment is generally printed on only a 1-line part of the recording paper 40. It is understood from the comparison between FIGS. 3 and 7 that the paper-saving requirement enables a decrease in a necessary length of the recording paper 40.

FIG. 8 shows another standard-resolution image printed on the recording paper 40 which occurs In the absence of a paper-saving requirement. FIG. 9 shows the same standard-resolution image printed on the recording paper 40 which occurs in the presence of a paper-saving requirement. It is understood from the comparison between FIGS. 8 and 9 that the paper-saving requirement enables a decrease in a necessary length of the recording paper 40.

Figure 10:
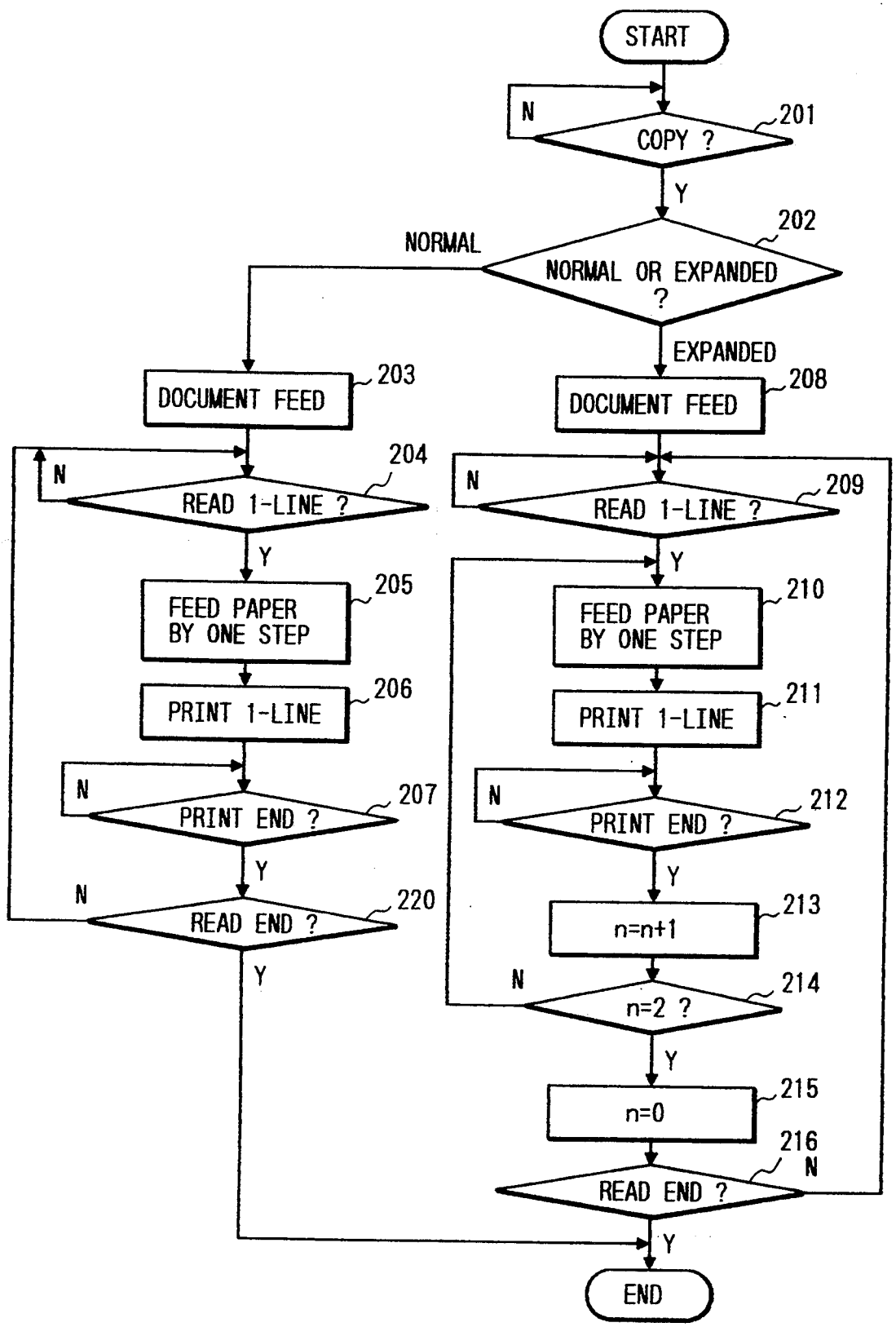
FIG. 10 is a flowchart of a copying segment of the program operating the controller in FIG. 1.

FIG. 10 is a flowchart of a copying segment of the program which is executed by the copy control section 15. Generally, a document paper to be copied is set on the facsimile apparatus before copying is started. The operation unit 10 includes a manually-operated switch via which a copying requirement can be inputted into the facsimile apparatus. In addition, the operation unit 10 includes a manually-operated switch which can be changed between two states and which is used to select one of expanded copying and normal copying.

As shown in FIG. 10, a first step 201 of the copying segment of the program decides whether or not a copying requirement is present by referring to an output signal of the operation unit 10. When a copying requirement is decided to be present, the program advances from the step 201 to a step 202. Otherwise, the step 201 is repeated again. The step 202 decides whether expanded copying or normal copying is selected by referring to an output signal of the operation unit 10. When normal copying is selected, the program advances from the step 202 to a step 203. When expanded copying is selected, the program advances from the step 202 to a step 208.

The step 203 controls a document feeding mechanism (not shown) so that the document paper to be copied will be fed along a sub scanning direction. The step 203 also activates the image scanner 8. The image scanner 8 scans the document paper line by line, converting an image of the document paper into a corresponding electric image signal. The image represented by an output signal of the image scanner 8 has a resolution of 7.7 line/mm. In other words, the document paper is scanned line by line at a pitch of 0.13 mm. The image information is then transferred to the memory 12. After the step 203, the program advances to a step 204.

The step 204 decides whether or not a 1-line portion of the image information has been read out from the document paper by referring to, for example, the output signal of the image scanner 8. When a 1-line portion of the image information has been read out, the program advances from the step 204 to a step 205. Otherwise, the step 204 is repeated again. The step 205 controls the drive circuit 13 so that a recording paper 40 will be fed by one step, that is, a distance of 0.13 min. A step 206 following the step 205 transfers the 1-line portion of the image information from the memory 12 to the drive circuit 13, and also controls the drive circuit 13 so that the 1-line portion of the image information will be printed on a line area (part) of the recording paper 40. After the step 206, the program advances to a step 207. The step 207 decides whether or not printing the 1-line portion of the image information has been completed. When printing the 1-line portion of the image information has been completed, the program advances from the step 207 to a step 220. Otherwise, the step 207 is repeated again. The step 220 decides whether or not the readout of all the image information from the document paper has been completed. When the readout of all the image information has been completed, the program exits from the step 220 and the execution of the copying segment of the program ends. Otherwise, the program returns from the step 220 to the step 204.

As a result, in the case of normal copying, each 1-line portion of the image information is printed on only a 1-line part of the recording paper 40. Thus, the document paper to be copied and the copy thereof have a relation of a "one line to one line" correspondence.

The step 208 controls the document feeding mechanism (not shown) so that the document paper to be copied will be fed along the sub scanning direction. The step 208 also activates the image scanner 8. The image scanner 8 scans the document paper line by line, converting an image of the document paper into a corresponding electric image signal. The image represented by an output signal of the image scanner 8 has a resolution of 7.7 line/mm. In other words, the document paper is scanned line by line at a pitch of 0.13 mm. The image information is then transferred to the memory 12. After the step 208, the program advances to a step 209.

The step 209 decides whether or not a 1-line portion of the image information has been read out from the document paper by referring to, for example, the output signal of the image scanner 8. When a 1-line portion of the image information has been read out, the program advances from the step 209 to a step 210. Otherwise, the step 209 is repeated again. The step 210 controls the drive circuit 13 so that a recording paper 40 will be fed by one step, that is, a distance of 0.13 mm. A step 211 following the step 210 transfers the 1-line portion of the image information from the memory 12 to the drive circuit 13, and also controls the drive circuit 13 so that the 1-line portion of the image information will be printed on a line area (part) of the recording paper 40. After the step 211, the program advances to a step 212.

The step 212 decides whether or not printing the 1-line portion of the image information has been completed. When printing the 1-line portion of the image information has been completed, the program advances from the step 212 to a step 213. Otherwise, the step 212 is repeated again. The step 213 increments a counter value "n" by "1". It should be noted that the counter value "n" is initially equal to "0" and is provided in the counter 14. A step 214 following the step 213 decides whether or not the counter value "n" is equal to "2". When the counter value "n" is decided to be equal to "2", the program advances from the step 214 to a step 215. When the counter value "n" is decided to be different from "2", the program returns from the step 214 to the step 210 so that the sequence of the steps 210-214 will be repeated again. The step 215 resets the counter value "n" to "0". After the step 215, the program advances to a step 216. The step 216 decides whether or not the readout of all the image information from the document paper has been completed. When the readout of all the image information has been completed, the program exits from the step 216 and the execution of the copying segment of the program ends. Otherwise, the program returns from the step 216 to the step 209.

As a result, in the case of expanded copying, each 1-line portion of the image information is repeatedly printed on two successive line parts of the recording paper 40. Thus, the document paper to be copied and the copy thereof have a relation of a "one line to two lines" correspondence. In other words, the copy of the original document paper is enlarged relative to the original document paper. The previously-mentioned paper-saving process causes a reduction of a reproduced image which can be compensated by the expanded copying.

DESCRIPTION OF THE SECOND PREFERRED EMBODIMENT

Figure 11:
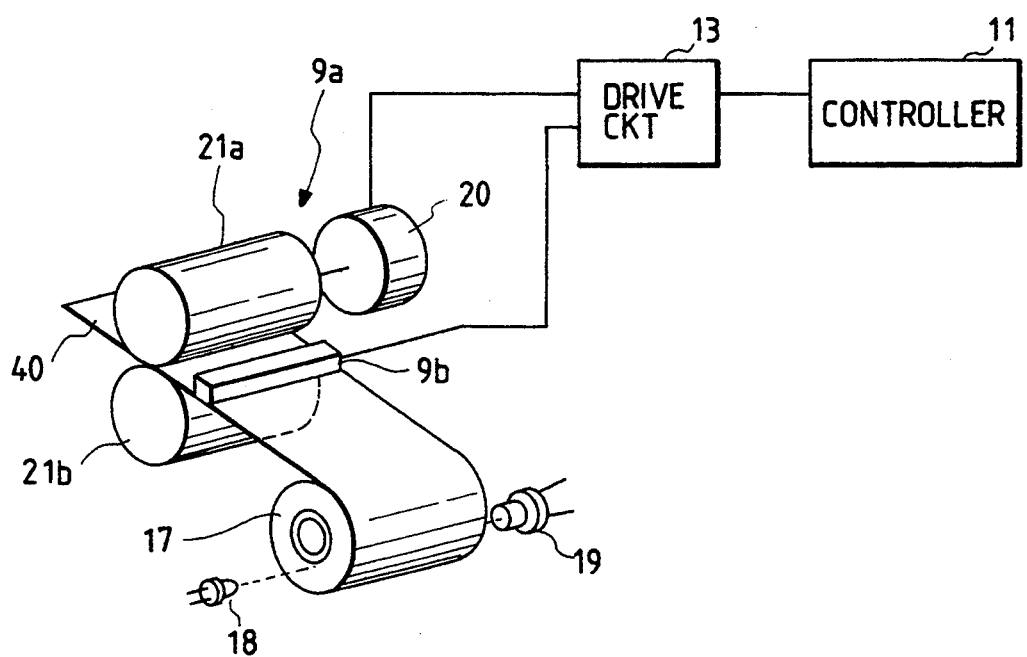
FIG. 11 is a diagram of a printer and associated devices in a facsimile apparatus according to a second embodiment of this invention.

FIG. 11 shows a portion of a second embodiment of this invention which is similar to the embodiment of FIGS. 1-10 except for design changes described hereinafter.

In the embodiment of FIG. 11, an unused part of a recording paper 40 forms a scroll (roll) 17. A sensor including a set of a light emitting element 18 and a light receiving element 19 detects whether or not an mount of an unused part of the recording paper 40 is smaller than a given mount. The light emitting element 18 and the light receiving element 19 are located at opposite sides of the scroll 17 of the recording paper 40 respectively, and are aligned regarding an optical axis. The light emitting element 18 outputs a beam of light toward the light receiving element 19.

When the amount of an unused part of the recording paper 40 is equal to or greater than the given amount, the light beam outputted from the light emitting element 18 is blocked by the scroll 17 of the recording paper 40 and is thus inhibited from reaching the light receiving element 19 so that the light receiving element 19 outputs an off signal. When the amount of an unused part of the recording paper 40 is smaller than the given amount, the light beam outputted from the light emitting element 18 is permitted to reach the light receiving element 19 so that the light receiving element 19 outputs an on signal.

The light receiving element 19 is connected to a controller 11 (see FIG. 1). The controller 11 serves to start a paper-saving process in response to an off-to-on change of the output signal of the light receiving element 19. Thus, when the amount of an unused part of the recording paper 40 is smaller than the given amount, the paper-saving process can be automatically executed.

DESCRIPTION OF THE THIRD PREFERRED EMBODIMENT

Figure 12:
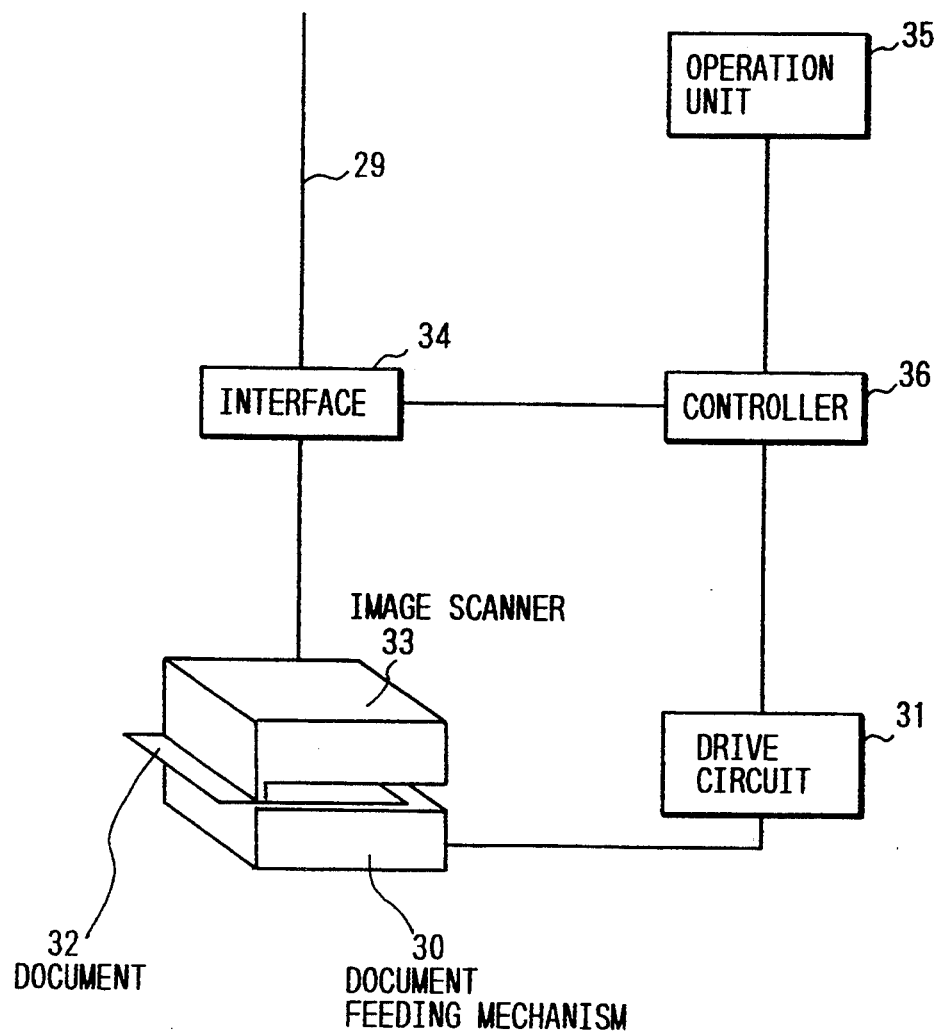
FIG. 12 is a block diagram of a facsimile apparatus according to a third embodiment of this invention.

With reference to FIG. 12, a facsimile apparatus includes a document feeding mechanism 30 having a combination of feed rollers and a drive motor. As the drive motor is actuated, the document feeding mechanism 30 feeds a document paper 32, the image of which is to be transmitted. A drive circuit 31 electrically connected to the document feeding mechanism 30 serves to output drive pulses to the drive motor in the document feeding mechanism 30. Each time the drive motor receives a drive pulse, the document paper 32 to be transmitted is fed by a step corresponding to a fine resolution of 7.7 line/mm. An image scanner 33 associated with the document feeding mechanism 30 optically scans the transmitted document paper 32, converting an image of the transmitted document paper 32 into a corresponding electric image signal.

A transmission-side interface circuit 34 receives an output signal of the image scanner 33 which represents information of the image of the transmitted document paper 32. The interface circuit 34 processes the image information. The interface circuit 34 includes a circuit for compressing the image information, and a circuit for modulating the compression-resultant image information. In addition, the interface circuit 34 includes a circuit for driving the image scanner 33. Furthermore, the interface circuit 34 includes receiving and transmitting circuits for information transmission control. The interface circuit 34 is connected to a transmission-side telephone line 29.

An operation unit 35 includes a manually-operated switch which is used to selectively execute and unexecute a reception-side paper-saving process. A transmission controller 36 connected to the drive circuit 31, the image scanner 33, the interface circuit 34, and the operation unit 35 serves to control the devices 31, 33, and 34 in response to an output signal of the operation unit 35.

Figure 13:
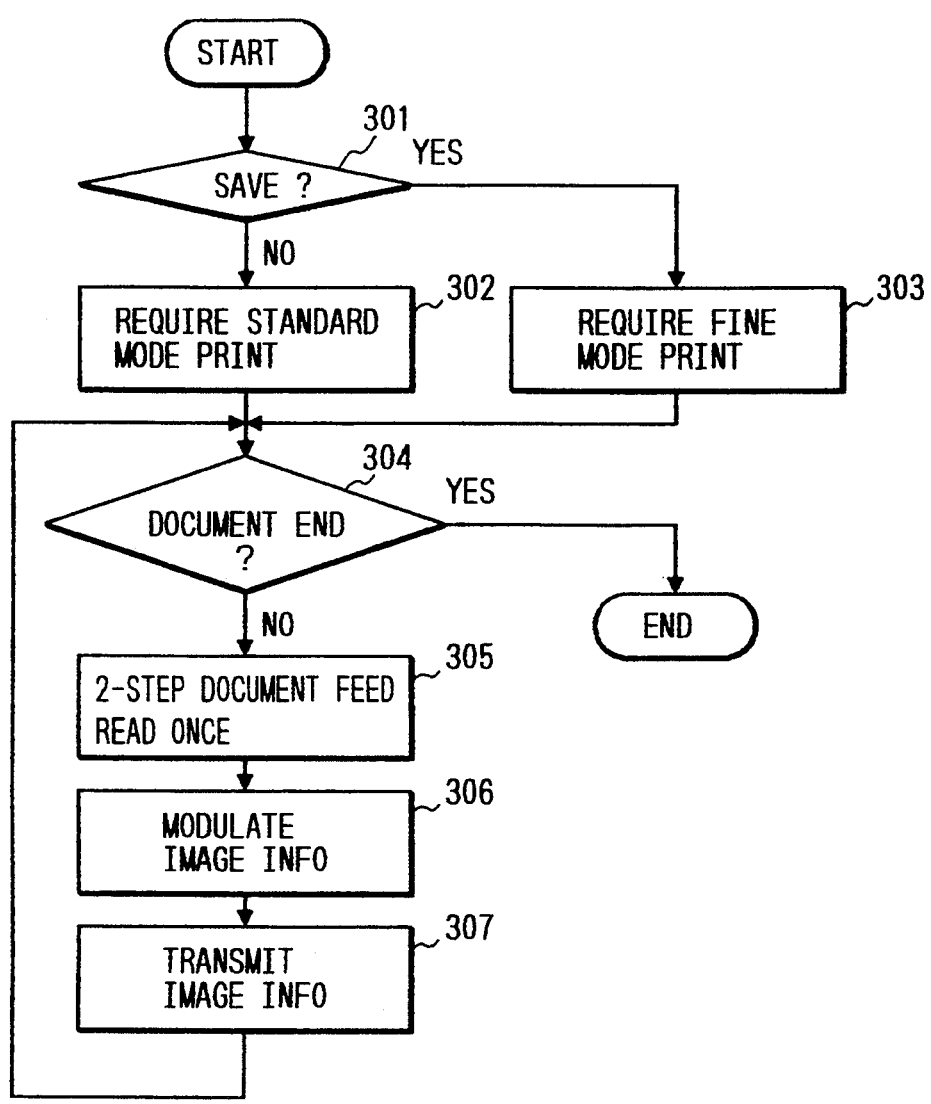
FIG. 13 is a flowchart of a program operating the transmission controller in FIG. 12.

The transmission controller 36 Includes a microcomputer having a combination of an I/O port, a CPU, a RAM, and a ROM. The transmission controller 36 operates in accordance with a program stored in the ROM. FIG. 13 is a flowchart of this program.

As shown in FIG. 13, a first step 301 of the program decides whether or not a reception-side paper-saving requirement is present by referring to an output signal of the operation unit 35. When a reception-side paper-saving requirement is decided to be absent, the program advances from the step 301 to a step 302. When a reception-side paper-saving requirement is decided to be present, the program advances from the step 301 to a step 303.

The step 302 controls the interface circuit 34 so that a reception side (a facsimile apparatus of the other party) will operate in a standard-resolution mode. After the step 302, the program advances to a step 304.

The step 304 decides whether or not the readout of all the image information from the transmitted document paper has been completed. When the readout of all the image information from the transmitted document paper has been completed, the program exits from the step 304 and the execution of the program ends. Otherwise, the program advances from the step 304 to a step 305.

The step 305 controls the drive circuit 31 and the image scanner 33 so as to force the devices 31 and 33 to execute the following processes. The drive circuit 31 outputs two successive drive pulses to the document feeding mechanism 30 so that the transmitted document paper 32 will be fed by two steps in the case where a standard-resolution mode of operation is required. During the feed of the transmitted document paper 32 by two steps, the image scanner 33 scans a 1-line area (part) of the transmitted document paper 32 to generate a 1-line portion of image information.

A step 306 following the step 305 controls the interface circuit 34 so as to compress and modulate the 1-line portion of the image information. A step 307 following the step 306 controls the interface circuit 34 so as to transmit a modulation-resultant signal to the telephone line 29. After the step 307, the program returns to the step 304.

The step 303 controls the interlace circuit 34 so that a reception side (a facsimile apparatus of the other party) will operate in a fine-resolution mode. After the step 303, the program advances to the step 304.

As understood from the previous description, in the case where the standard-resolution mode of operation of the transmission-side facsimile apparatus is required and also the reception-side paper-saving process is required, the transmission-side facsimile apparatus is actually operated in the standard-resolution mode while the reception-side facsimile apparatus is operated in the fine-resolution mode. During the standard-resolution mode of operation of the transmission-side facsimile apparatus, a 1-line portion of the image information is transmitted each time the transmitted document paper is fed by two steps. During the fine-resolution mode of operation of the reception-side facsimile apparatus, a 1-line portion of image information is printed each time a recording paper is fed by a step. Thus, the above-mentioned case, a necessary length of the recording paper can be decreased.

DESCRIPTION OF THE FOURTH PREFERRED EMBODIMENT

A fourth embodiment of this invention is similar to the embodiment of FIGS. 12 and 13 except for design changes described hereinafter.

Figure 14:
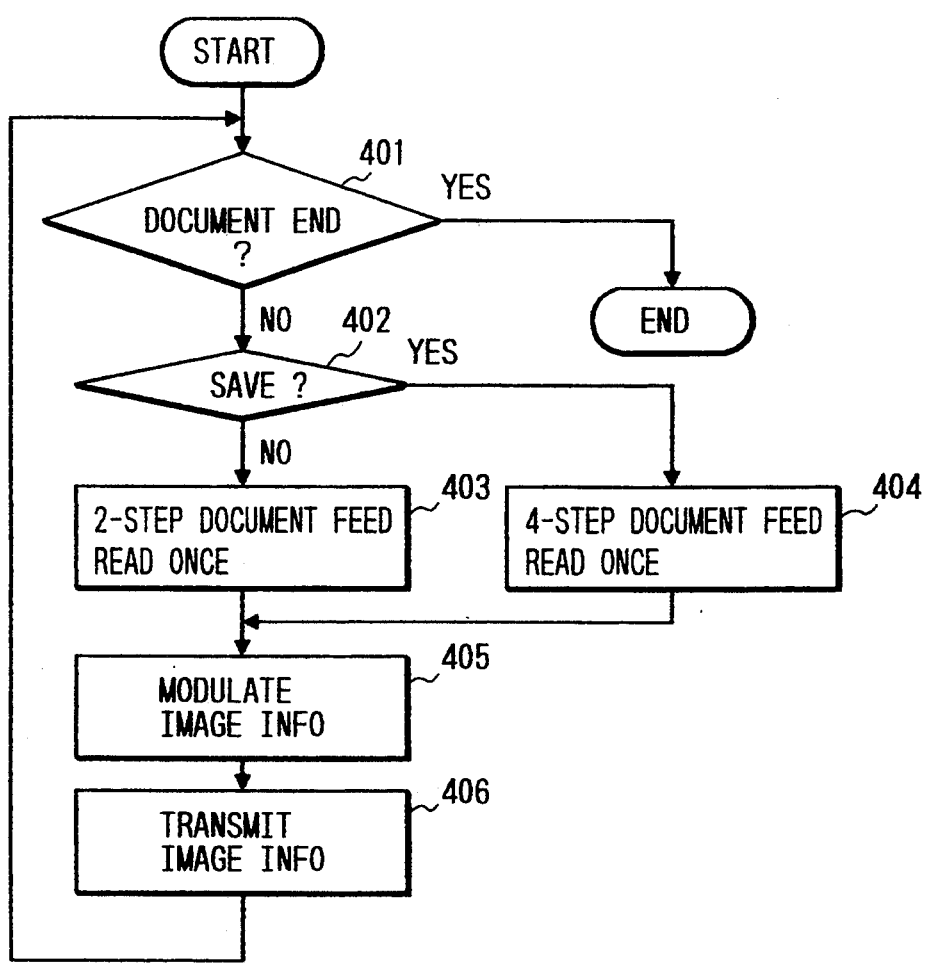
FIG. 14 is a flowchart of a program operating a transmission controller in a facsimile apparatus according to a fourth embodiment of this invention.

FIG. 14 is a flowchart of a program for operating a transmission controller 36 (see FIG. 12) in the fourth embodiment. As shown in FIG. 14, a first step 401 of the program decides whether or not the readout of all image information from a transmitted document paper 32 (see FIG. 12) has been completed. When the readout of all the image information from the transmitted document paper has been completed, the program exits from the step 401 and the execution of the program ends. Otherwise, the program advances from the step 401 to a step 402.

The step 402 decides whether or not a reception-side paper-saving requirement is present by referring to an output signal of an operation unit 35 (see FIG. 12). When a reception-side paper-saving requirement is decided to be absent, the program advances from the step 402 to a step 403. When a reception-side paper-saving requirement is decided to be present, the program advances from the step 402 to a step 404.

The step 403 controls a drive circuit 31 and an image scanner 33 (see FIG. 12) so as to force the devices 31 and 33 to execute the following processes. The drive circuit 31 outputs two successive drive pulses to a document feeding mechanism 30 (see FIG. 12) so that the transmitted document paper 32 will be fed by two steps in the case where a standard-resolution mode of operation is required. During the feed of the transmitted document paper 32 by two steps, the image scanner 33 scans a 1-line area (part) of the transmitted document paper 32 to generate a 1-line portion of image information. After the step 403, the program advances to a step 405.

The step 404 controls the drive circuit 31 and the image scanner 33 (see FIG. 12) so as to force the devices 31 and 33 to execute the following processes. The drive circuit 31 outputs four successive drive pulses to the document feeding mechanism 30 (see FIG. 12) so that the transmitted document paper 32 will be fed by four steps in the case where a standard-resolution mode of operation is required. During the feed of the transmitted document paper 32 by four steps, the image scanner 33 scans a 1-line area (part) of the transmitted document paper 32 to generate a 1-line portion of image information. After the step 404, the program advances to the step 405.

The step 405 controls an interface circuit 34 (see FIG. 12) so as to compress and modulate the 1-line portion of the image information. A step 406 following the step 405 controls the interface circuit 34 so as to transmit a modulation-resultant signal of a standard-resolution format to a telephone line 29 (see FIG. 12). After the step 406, the program returns to the step 401.

As described previously, in the case where the reception-side paper-saving process is required, a 1-line portion of the image information is generated each time the transmitted document paper 32 is fed by four steps. In addition, the 1-line portion of the image information is transmitted according to the standard-resolution transmission format. Thus, in this case, a necessary length of a recording paper in a reception-side facsimile apparatus can be decreased.

What is claimed is:

1. A facsimile apparatus comprising:
   signal generation means for generating a signal representing whether or not a recording paper saving operation is required;
   printing means for printing an image on the recording paper, wherein said printing means includes a recording-paper feeding means for feeding a recording paper in line area increments and a printing head for printing line segments of an image on said recording paper; and
   control means, connected to the signal generation means and the printing means, for controlling the printing means to print one line segment of an image on one line area of the recording paper when the signal generated by the signal generation means represents that the recording paper saving operation is required, and for controlling the printing means to print one line segment of an image twice on two successive line areas of the recording paper when the signal generated by the signal generation means represents that the recording paper saving operation is not required;
   wherein the control means controls the recording-paper feeding means to feed a first line area of recording paper, controls the printhead to print the line segment on the first line area, controls the recording-paper feeding means to feed a second line area of recording paper, and controls the printhead to print the line segment on the second line area when the recording paper saving operation is not required.

2. The facsimile apparatus of claim 1, wherein the signal generation means comprises a manually operable switch that is changeable between a first state, in which the signal indicating that saving of recording paper is not required is not generated, and a second state, in which the signal indicating that saving of recording paper is not required is generated.

3. The facsimile apparatus of claim 1, wherein the signal generation means comprises a sensor for detecting whether or not an amount of an unused part of the recording paper is smaller than a given amount, and means for setting a requirement of saving the recording paper when the sensor detects that the amount of the unused part of the recording paper is smaller than the given amount.

4. The facsimile apparatus of claim 1 further comprising means for reading out an image on a document paper, and means for enlarging said readout image and printing the enlarged image on the recording paper.

* * * * *